United States Patent
Tanase et al.

(10) Patent No.: US 9,480,207 B2
(45) Date of Patent: Nov. 1, 2016

(54) LIGHTING SYSTEM WITH COOLING ARRANGEMENT

(75) Inventors: Cristina Tanase, Waalre (NL); Rob Franciscus Maria Van Elmpt, Roermond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 89 days.

(21) Appl. No.: 13/634,968

(22) PCT Filed: Mar. 16, 2011

(86) PCT No.: PCT/IB2011/051095
§ 371 (c)(1),
(2), (4) Date: Sep. 14, 2012

(87) PCT Pub. No.: WO2011/117778
PCT Pub. Date: Sep. 29, 2011

(65) Prior Publication Data
US 2013/0000185 A1 Jan. 3, 2013

(30) Foreign Application Priority Data
Mar. 22, 2010 (EP) .................................. 101577177

(51) Int. Cl.
*A01G 9/18* (2006.01)
*A01G 7/02* (2006.01)
*A01G 7/04* (2006.01)
(Continued)

(52) U.S. Cl.
CPC . *A01G 9/18* (2013.01); *A01G 7/02* (2013.01); *A01G 7/045* (2013.01); *F21V 29/00* (2013.01); *F21V 29/02* (2013.01); *F21Y 2101/02* (2013.01)

(58) Field of Classification Search
CPC .......... A01G 7/02; A01G 7/045; A01G 9/18; F21V 29/00; F21V 29/02
USPC ....... 47/17, 1.01 R, DIG. 6, 58.1 R, 58.1 LS, 47/60, 61; 313/36, 44, 11, 512; 362/249.02, 294, 227, 234, 253, 800, 362/805, 563
See application file for complete search history.

(56) References Cited

U.S. PATENT DOCUMENTS

| 7,252,385 B2 | 8/2007 | Engle et al. |
| 2003/0076021 A1 | 4/2003 | Woolford |

(Continued)

FOREIGN PATENT DOCUMENTS

| JP | 010013919 A | 1/1998 |
| JP | 2007236235 A | 9/2007 |

(Continued)

*Primary Examiner* — Trinh Nguyen

(57) ABSTRACT

The invention provides a lighting system (100, 200, 300) for controlling the growth of plants, the system comprising; an array of solid state/semiconductor light sources (101, 201, 301) adapted to emit light of a predetermined wavelength or wavelength range; and a cooling arrangement(102, 202, 302) comprising a pipe (103, 203, 303) having at least one inlet opening for receiving a gaseous cooling medium and a plurality of outlet openings (105, 205, 305) for releasing said gaseous cooling medium from said cooling arrangement, the cooling arrangement being in mechanical and thermal contact with said light sources. The invention also provides a method for controlling the growth of a plant in a greenhouse of growth chamber. The invention allows promoting the photosynthesis of a plant by modifying the conditions (light intensity, temperature, $CO_2$ concentration) locally around the plant.

13 Claims, 3 Drawing Sheets

(51) Int. Cl.
   *F21V 29/00*    (2015.01)
   *F21V 29/02*    (2006.01)
   *F21Y 101/02*   (2006.01)

(56) References Cited

U.S. PATENT DOCUMENTS

2008/0315132 A1* 12/2008 Platsch .................... 250/504 R

2009/0308586 A1    12/2009 Juslen

FOREIGN PATENT DOCUMENTS

| WO | 2007093607 A1 | 8/2007 |
| WO | 2008010121 A2 | 1/2008 |
| WO | 2009133495 A1 | 11/2009 |
| WO | 2010013183 A1 | 2/2010 |

* cited by examiner

LIGHTING SYSTEM WITH COOLING ARRANGEMENT

FIELD OF THE INVENTION

The present invention relates to solid state light sources and their use in promoting the growth of a crop in a greenhouse or growth chamber.

BACKGROUND OF THE INVENTION

In greenhouses (using daylight) and growth chambers (without daylight) plants are grown throughout the year. The closed environment of a greenhouse or growth chamber requires good control of different parameters in order to provide for optimal photosynthesis of the plants. Three of the most important parameters that control the photosynthesis and thus the plant growth are the ambient light intensity, the temperature and the concentration of carbon dioxide ($CO_2$). There are today various control systems for monitoring and/or controlling the growth of plants by controlling one or more of said parameters, e.g. using $CO_2$ generators for increasing the $CO_2$ concentration in the greenhouse or growth chamber, and additional lighting arrangements.

The addition of $CO_2$ using conventional systems is effected by raising the general concentration of $CO_2$ in the greenhouse usually to about 1300 ppm. However, a disadvantage of such systems is that the $CO_2$ concentration close to the leaves of the plants, where the photosynthesis takes place, might be lower (e.g. due to depletion), and not high enough to achieve the desired increase in the photosynthesis.

To provide additional lighting for greenhouses and growth chambers, high brightness, highly efficient light emitting diodes (LEDs) are becoming more and more interesting because of their low energy consumption, good efficiency, low cost, and the possibility of adapting the color output.

The light output of an LED depends on a number of factors such as the brightness of the LED, any optics used to create a certain light pattern, the current delivered to the LED, and the junction temperature of the LED (i.e. the temperature of the light emitting portion of the LED). In general the light output of an LED is reported for a particular junction temperature. The light output decreases with increasing temperature generated by the operation of the LED, and the efficiency of the LED is thus reduced for higher temperatures. Furthermore, the lifetime of the LED is also influenced by the junction temperature, higher junction temperatures decreasing the lifetime of the device.

Various methods may be used to cool LEDs during operation. One commonly used technique is to thermally couple the LED to a heat sink which dissipates the heat generated by the LED into the ambience. Alternatively, forced air or liquid may be used to cool an LED. These methods may result in a reduction in junction temperature sufficient in order to obtain the desired light output. However, the constant desire to increase the individual LED light output creates a need for thermal management that goes beyond the capabilities of a conventional heat sink.

WO 2007/093607 discloses a lighting device for stimulating the growth of plants. The lighting device has a solid state light source for emitting light of at least one wavelength within a predetermined wavelength range. The solid state light source is in contact with a cooling medium, the cooling medium having a temperature in the range between $-50°$ C. and $0°$ C., preferably between $-50°$ C. and $-20°$ C.

However, the use of such cold cooling medium is a disadvantage, requiring that the medium be encapsulated in at least two tubes.

Hence, there is clearly a need in the art for improved LED based lighting devices, and in particular lighting devices for use in large scale greenhouses and growth chambers to promote or control growth of plants.

SUMMARY OF THE INVENTION

It is an object of the present invention to at least partly overcome the problems of the prior art, and to provide a strategy for improved thermal management of LEDs used for promoting or controlling growth of plants, while also providing improved control of conditions that influence the growth of the plants.

According to a first aspect, the invention provides a lighting system for promoting the growth of plants, the system comprising:
  an array of solid state light sources adapted to emit light of a predetermined wavelength or wavelength range; and
  a cooling arrangement, comprising a pipe for conducting a cooling medium, the pipe having at least one inlet opening for receiving a gaseous cooling medium and a plurality of outlet openings for releasing said gaseous cooling medium from said cooling arrangement, the cooling arrangement being in mechanical and thermal contact with said light sources. Typically, the pipe is thermally conductive. Also typically, at least part of said pipe is in thermal connection with said light sources.

Typically, the cooling arrangement is connectable to a source of $CO_2$. In embodiments of the invention, the cooling arrangement is connected to a source of $CO_2$, e.g. a $CO_2$ generator or a $CO_2$ tank.

The present invention allows integration of lighting and $CO_2$ dosing in a single system. The system can be placed close to the plants, such that light and $CO_2$ is supplied close to the leaves of the plant, thus adapting the conditions (light intensity, temperature, $CO_2$ concentration) locally around the plant, in order to promote the photosynthesis. The system according to the invention can be used very efficiently to provide the necessary conditions locally around the plant, in particular near the leaves, by providing simultaneously light and $CO_2$, both of which are required for photosynthesis.

Advantageously, by providing $CO_2$ at the site of the plant, high ambient concentrations of $CO_2$ in the growth chamber or greenhouse may be avoided.

Furthermore, by the present invention, the use of separate systems for lighting and $CO_2$ supplementation may be avoided, thus reducing costs.

The lighting system of the present invention has a simple construction. It may be made very slim, such that blocking of daylight (also known as daylight interception) is largely reduced or avoided.

In addition to supplying light and $CO_2$ to the plant, the system according to the invention has the further advantage that the cooling medium released from the system may be heated by the LEDs to a temperature above the ambient temperature within the greenhouse or growth chamber and thus, when released, may further increase the temperature locally around plant, which further enhances the photosynthesis. Moreover, the warm flowing medium released in the direction of the plant may prevent high humidity levels which are known to favor the development of pathogens such as fungi.

In embodiments of the invention, the outlet openings may be closable. In particular, the openings may be variably closable, such that the size of the outlet opening is adjustable. In this way the release of the cooling medium can be controlled. It is particularly advantageous to be able to control the release of a $CO_2$ containing cooling medium, so as to provide a desirable $CO_2$ addition to the plant.

Typically, the cooling arrangement may form an open system adapted to take in air from the outside of the greenhouse or growth chamber and to release it inside the greenhouse or growth chamber.

In embodiments of the invention, the array of solid state light sources is arranged on the outside of said pipe. The outlet openings may then typically be located on the same side of the pipe as the light sources.

In embodiments of the invention the system may further comprise one or more of the following devices and monitors: a closure control device for controlling the size of the outlet openings; a light output control device; a temperature monitor; a $CO_2$ content monitor; and a clock or a timer. Thus, based on information relating to one of the relevant parameters, in particular temperature, $CO_2$ concentration in the cooling medium within the cooling arrangement, $CO_2$ concentration around the plant, LED power consumption and light intensity, one or more of the other parameters may be adjusted by controlling e.g. the LED power supply, the intake of air as cooling medium, the $CO_2$ supplementation of the cooling medium, and/or the size of the outlet openings, so as to provide the optimal conditions.

In another aspect the invention relates to a method of controlling the growth of a plant in a greenhouse or growth chamber, the method comprising the steps of:
  providing a system as described above, wherein said array of light sources and said plurality of outlet openings are located in the interior of the greenhouse or growth chamber;
  introducing a cooling medium containing $CO_2$ into the pipe via the at least one inlet opening;
  conducting said cooling medium through the pipe such that the cooling medium may absorb heat generated by said array of light sources; and
  allowing said cooling medium to escape from the cooling arrangement via one or more of the outlet openings into the greenhouse or growth chamber.

Typically, at least one of said light sources and at least one of said plurality of outlet openings are located in the vicinity of a plant whose growth is to be controlled.

Advantageously, the method according to the invention provides simultaneously light and $CO_2$ at the site of the plant where it is most useful. Hence, by controlling the $CO_2$ concentration locally around the plant high ambient concentrations of $CO_2$ in the growth chamber or greenhouse, which may be harmful to humans, can be avoided. Furthermore, the flow of cooling medium around to the plant may prevent the growth of pathogenic microorganisms, in particular fungi, by keeping the humidity around the plant at a moderate level. Further advantages are described above in relation to the lighting system used in the method of the invention.

In embodiments of the invention the cooling medium is ambient air collected from outside of the greenhouse or growth chamber. This is very advantageous since air is an inexpensive cooling medium and when using outside air, generally no separate cooling of the cooling medium is necessary. The method is thus very energy efficient.

Air as such contains $CO_2$ that may be used for promoting the photosynthesis. The method is however even more effective when the cooling medium has a $CO_2$ content higher than the $CO_2$ content of normal air. The method may therefore comprise a step of supplementing the cooling medium with $CO_2$ before it is allowed to escape from the cooling arrangement into the greenhouse or growth chamber. In particular, when outside air is used as the cooling medium, it is therefore particularly advantageous to supplement the cooling medium with $CO_2$ in order to allow an increase in the $CO_2$ concentration around the plant, achieved by release of $CO_2$ containing cooling medium from the cooling arrangement in the direction of the plant.

In embodiments of the invention, the cooling medium has a $CO_2$ content of at least 500 ppm, preferably at least 1000 ppm or more preferably at least 1300 ppm.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

DETAILED DESCRIPTION

Figure 1:
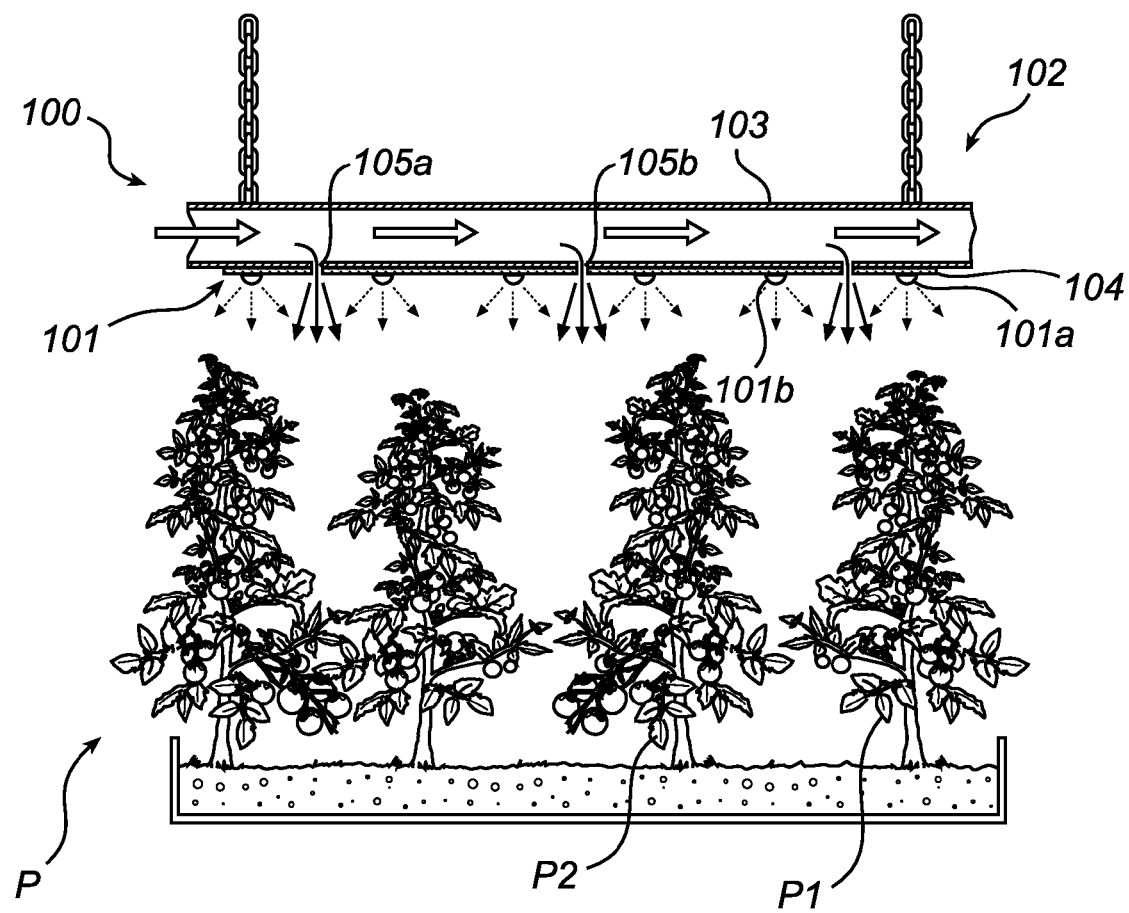
FIG. 1 shows a cross-sectional long side view of a lighting system according to one embodiment of the invention.

FIG. 1 shows a first embodiment of a lighting system for controlling and/or promoting the growth of plants, especially in a growth chamber or a greenhouse. The embodiment of FIG. 1 is particularly suited for being arranged (e.g. suspended) at a short distance from the plants to be influenced.

The lighting system 100 comprises an array 101 of solid state light sources 101a, 101b etc (collectively referred to as light sources 101), here LEDs, mounted on and in thermal contact with a cooling arrangement 102, comprising a pipe 103 having an inlet opening (not shown) and a plurality of outlet openings 105a, 105b etc. The light sources 101 are electrically coupled to a power supply (not shown) for their operation.

For photosynthesis plants use mainly light in the wavelength ranges of 400-500 nm (blue light) and 600-700 nm (red). However, depending on the type of crop, the plant may use light of the whole visible spectrum (white light). Accordingly, the LEDs 101 may adapted to emit light in the wavelength range of from 400 nm to 800 nm, or of one or more subranges thereof, such as 400-500 nm and/or 600-700 nm.

The cooling arrangement 102 comprises a pipe 103 through which a gaseous cooling medium may be conducted. The pipe 103 has at least one inlet opening (not shown) for receiving the cooling medium. The medium is typically pumped into the pipe 103 by means of a pump (not shown) optionally in combination with an air compressor (not shown).

The cooling arrangement 102 is in thermal contact with the LEDs 101 via the LED printed circuit board (PCB) which is connected to a heat sink 104. The PCB is at least partially thermally conductive, and may comprise a ceramic, glass reinforced epoxy laminate, such as FR4, or a metal core PCB (MCPCB). The LEDs 101 are attached to the heat sink 104 by any conventional means allowing heat conduction. It is also possible to connect the LEDs via the PCB directly to the pipe 103, that is, without the use of a heat sink.

The LEDs 101 are arranged to emit light in the direction away from the pipe 103, the light being intended for one or more plants P1, P2 etc (collectively referred to as plants P) located in the vicinity of the lighting system 100.

The plurality of outlet openings 105a, 105b etc, collectively referred to as outlet openings 105, are arranged along the pipe 103 in the lengthwise direction. The openings 105 allow the cooling medium conducted in the pipe 103 to escape into the ambience. Typically all outlet openings 105 are located on generally the same side of the pipe 103, which is also typically the side of the pipe on which the LEDs 101 are mounted. Since the outlet openings are typically located on a side of the pipe 103 intended to face a plant, the cooling medium will escape from the pipe in the direction of the plants P.

According to the present invention, heat generated by the LEDs during operation is conducted via the heat sink 104 to the pipe 103, which is also thermally conductive. The pipe 103 may be completely or partly formed of a thermally conductive material, such as metal (e.g. aluminum, copper), plastic or ceramic with sufficient heat conducting properties (e.g. plastic with mineral particles). The heat is then transferred by radiation from the pipe 103 to the cooling medium flowing within the pipe. The cooling medium may escape from the cooling arrangement 102 via the openings 105. Hence, heat is removed from the LEDs and the temperature of the LEDs may thus be effectively kept at an acceptable level.

Instead of, or in addition to, being released via the outlet openings 105, the heated cooling medium may be further conducted within the pipe 103 to a distal outlet opening (not shown) through which it may be released from the cooling arrangement 102. Such a distal outlet opening may be located outside the greenhouse or growth chamber.

The system 100 may be placed at a distance of a few centimeters to about 2 m from the plants. The distance typically depends on the type of growth chamber or greenhouse and/or on the arrangement of the rows of plants. For example, in a non-daylight growth chamber using multiple layers of plant rows, the lighting system may be placed at a short to medium distance, such as from a few centimeters up to about 1 m, from the plants. In a greenhouse, the lighting system in the form of an intercanopy unit (see FIG. 3 below) may also be arranged at a greater distance, from a few centimeters up to about 1 m or more, or even up to about 2 m, from the plants.

Typically, the cooling medium is air, preferably ambient air collected from outside of the greenhouse or growth chamber, i.e. outdoor air. The air may be supplemented with $CO_2$ using a conventional $CO_2$ source.

The normal content of $CO_2$ in air is about 340 ppm. Growing plants in a closed greenhouse are capable of reducing the $CO_2$ concentration during the day to 200 ppm, at which concentration the photosynthesis of the plants is considerably decreased. On the other hand, it has been shown that an increase in the ambient $CO_2$ concentration determines an increase of the photosynthesis. For Chysantemum plants, an increase of ambient $CO_2$ from 350 ppm (normal value in air) to 1000 ppm resulted in a 40% increase of photosynthesis at 21° C., and 75% increase at 30° C. (E. Rosenqvist, Green Knowledge, vol 22, 2000). In order to avoid $CO_2$ depletion, and to stimulate the growth of the crop, greenhouses are usually supplemented with $CO_2$ using a $CO_2$ generator located in the greenhouse and operated by burning of carbon-based fuels such as natural gas or propane. Alternatively, pure $CO_2$ may be supplied from a tank.

The cooling medium used in the present invention may be supplemented with $CO_2$ from a conventional $CO_2$ generator or a tank. Optionally, the generator or tank used for $CO_2$ supplementation of the cooling medium may be the same unit used for increasing the general concentration of $CO_2$ in the greenhouse, if such a unit is used. In order to provide $CO_2$ supplementation of the cooling medium, the cooling arrangement 102 may be connected to a $CO_2$ generator or a $CO_2$ tank, optionally via a second inlet opening. Thus, the cooling medium may be supplemented with $CO_2$ before or after the cooling medium is introduced into the pipe. After supplementation, the content of $CO_2$ in the cooling medium may be at least 500 ppm, at least 800 ppm, at least 1000 ppm or at least 1300 ppm. The desired $CO_2$ content of the cooling medium typically depends on the desired $CO_2$ concentration around the plant, which may be different for different crops and at different times during the day or night, and on the desired flow rate of the cooling medium.

Thus, the simultaneous provision of illumination by the LEDs 101 and the release of cooling medium supplemented with $CO_2$ (or any medium containing high concentration of $CO_2$) in the direct vicinity of a plant P1 favors the growth of the plant.

The lighting system according to the invention thus comprises a cooling arrangement which preferably forms an open system. Typically the cooling medium is then not recycled.

The outlet openings 105 may be closable, preferably variably closable, e.g. by means of one or more closing member(s) arranged in connection with the pipe 103. Thus, the size of the outlet openings 105 may be adjusted. The flow of cooling medium released into the greenhouse may thus be determined by the combination of the flow rate in the pipe 103 and the size of the outlet openings 105. The closing member may be mechanically regulated, or it may be regulated by an electronic closure control device optionally connected to further control devices as described below.

The lighting system may optionally comprise a light output control device operatively connected to the LED power supply to control the output of the light source. Furthermore, the system may optionally comprise one or more temperature monitors for monitoring the temperature of the LED system, in particular the heat sink, and/or the heated cooling medium.

The system may optionally comprise a $CO_2$ content monitor providing information about the $CO_2$ concentration in the greenhouse or growth chamber, and in particular the $CO_2$ concentration near the plants P.

Furthermore, the system may optionally comprise a clock or a timer to which the flow control device, the closure control device and/or the light output control device may be interconnected such that the air flow rate, the size of the outlet openings and/or the light output may be controlled as a function of time or of time of day.

Two or more of the said monitors and devices may optionally be interconnected in a control system for fully or partly automatically controlling the light intensity, temperature and/or $CO_2$ addition to the plants. For example, the temperature information and/or the $CO_2$ content information may be used in a feedback mechanism to regulate the flow rate of the cooling medium in the pipe 103, the $CO_2$ concentration in the cooling medium via $CO_2$ supplementation from a $CO_2$ source, and/or the size of the outlet openings 105. Thus, for a particular light output, the cooling capacity of the cooling arrangement 102 may be optimized by suitably adapting the flow rate of the cooling medium in the pipe 103, and the $CO_2$ content (in the greenhouse in general or merely near the plant) may be maintained, increased or otherwise optimized by suitably adjusting the size of the outlet openings 105 and/or adjusting the concentration of $CO_2$ supplementation of the cooling medium.

Figure 2A:
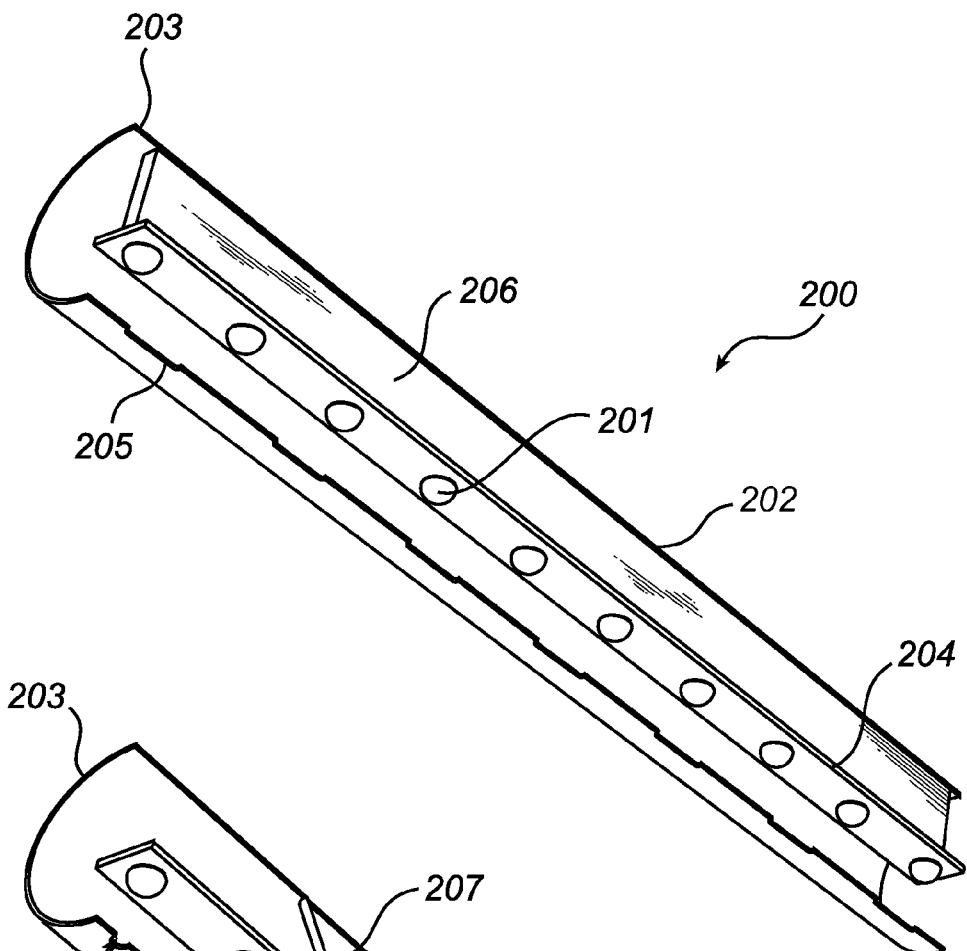
FIGS. 2a and 2b show cross-sectional perspective side view of a lighting system according to other embodiments of the invention.
Figure 2B:
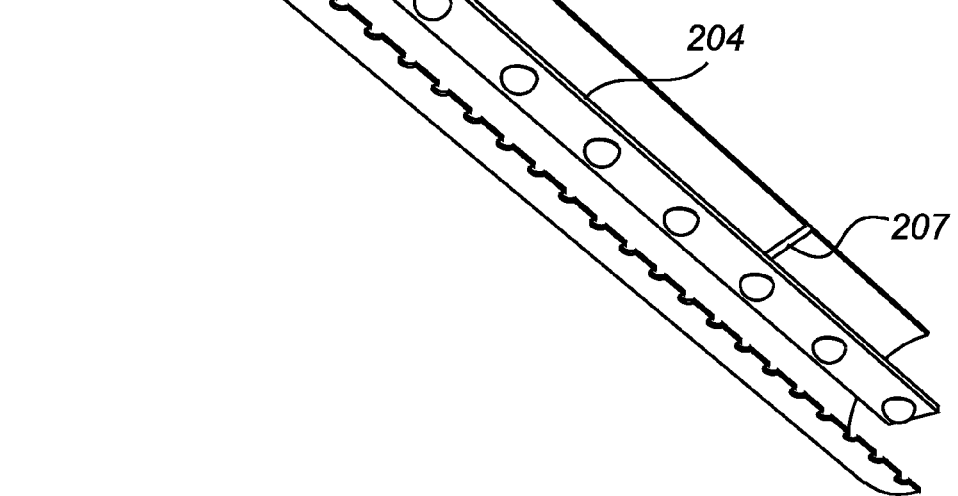

FIGS. 2a and 2b show alternative embodiments of the lighting system of the invention in which the light sources are integrated in the cooling arrangement. Referring to FIG. 2a, the lighting system 200 comprises an array of LEDs 201 and a cooling arrangement 202 as described above, having outlet openings 205, with the exception that the LED array 201 is arranged inside the pipe 203 of the cooling arrangement 202. In these embodiments, the pipe 203 is at least partially transmissive to light from the LEDs. The LEDs 201 are arranged on a PCB 204 which is directly connected to a holder 206 attached to the pipe 203. A heat sink is not required. In FIG. 2b, the lighting system 200 comprises an array of LEDs 201 and a cooling arrangement 202 as described above, having a outlet openings 205, and the LED PCB 204 is fixed using holder legs 207 to the inside of the pipe 203. A heat sink is not required. Holder means 206 and 207 are merely exemplary means for fixing the LED PCB inside the pipe 203, and it is contemplated that also other means and solutions may be employed for mounting the LEDs 201 inside the pipe 203.

Figure 3:
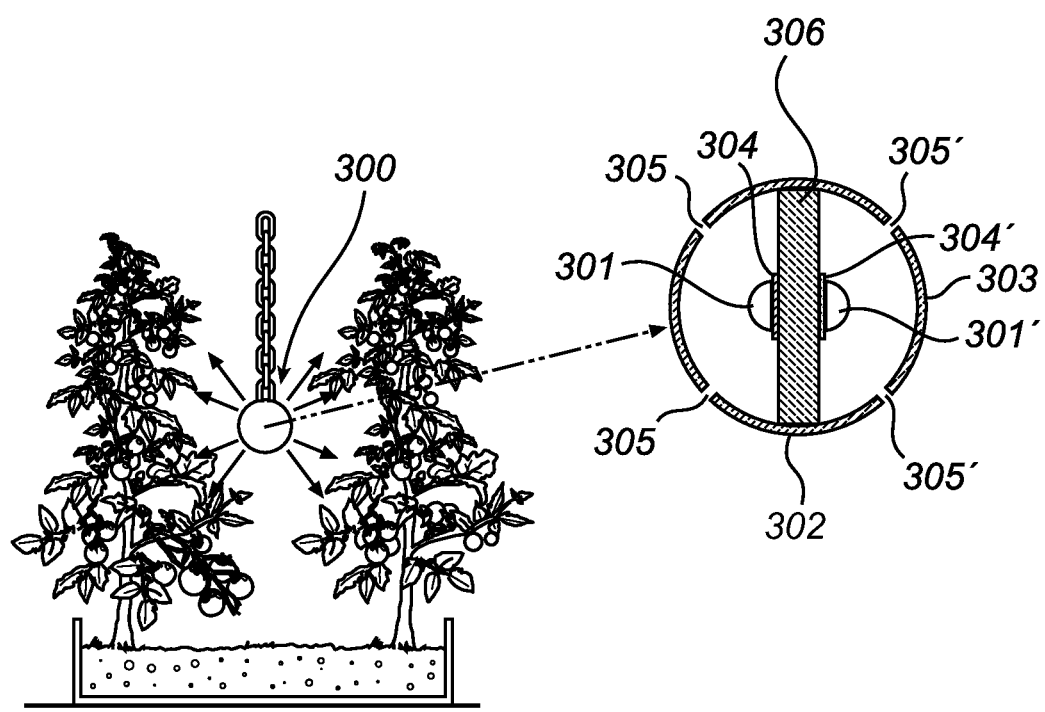
FIG. 3 shows a cross-sectional short side view of a lighting system according to another embodiment of the invention.

FIG. 3 shows another embodiment of the lighting device according to the invention, in which the light sources are integrated as described above with reference to FIG. 2. However, it is also contemplated that the LEDs may be mounted on the outside of the pipe 303 as described above with reference to FIG. 1.

The lighting system 300 is a so-called intercanopy unit, seen in cross-section from its short end. The intercanopy lighting system 300 serves to supply light and $CO_2$ to plants, typically rows of plants, located on both sides of the lighting system 300. The lighting system 300 comprises a cooling arrangement 302 and first and second arrays of LEDs 301, 301', located on opposite sides of the pipe 303 and directed towards the respective adjacent plants.

The cooling arrangement 302 comprises a pipe 303 as described above, having a plurality of first outlet openings 305, located on the same side of the pipe 303 as the first array of LEDs 301, and additionally a plurality of second outlet openings 305' located on the same side as the second array of LEDs 301'. Thus, the cooling medium may be released towards both plant rows. The size of the first outlet openings 305 and the size of the second outlet openings 305', respectively, may optionally each be regulated independently of the other.

In embodiments of the invention, the cooling arrangement 102, 202, 302 may be used also for controlling the ambient temperature of the plant. Although plant growth may be enhanced by higher temperature, the growth of pathogens and other undesirable organisms may also be promoted at higher temperature. Thus, it may be preferable to keep the temperature around the plants at a moderate level, e.g. 10-50° C. The optimal temperature depends on the crop and also on whether it is desirable to keep the plant in a vegetative stage (high growth) or bring it to a generative stage (high production of fruit). The cooling medium released from the cooling arrangement may help to maintain an optimized temperature around the plant, reducing the growth of pathogens, in particular fungi. Additionally, where a cooling medium of relatively low humidity, e.g. outside air, is used, the release of cooling medium in the vicinity of the plants may reduce the humidity around the plant, which may prevent the growth of pathogens such as fungi.

According to embodiments of the invention, the function of the lighting system may be controlled to provide optimized conditions for promoting the growth and the health of the plant. For example, the system may be regulated to provide high release of the $CO_2$ containing cooling medium for short periods of time to promote the photosynthesis. This may be correlated to a particular time of the day when the plant has high capacity for photosynthesis. The light output, the flow rate of cooling medium in the pipe 103, 203, 303, and the sizes of the outlet openings 105, 205, 305, 305' may be suitably adjusted to provide desirable light intensity at an acceptable temperature, in combination with the high release of cooling medium. In other situations, when neither $CO_2$ addition nor temperature control of the plants is desirable, the openings 105, 205, 305, 305' may be closed such that the cooling medium is used for cooling of the LEDs only.

The person skilled in the art realizes that the present invention by no means is limited to the preferred embodiments described above. On the contrary, many modifications and variations are possible within the scope of the appended claims. For example, the lighting system may adapted for multilayer application, in which light may be emitted in one direction (typically downwards, as in FIG. 1) but the outlet openings may be provided on two sides of the pipe such that the cooling medium is released in several directions, both towards the plant below and towards the roots of a plant located on a shelf above the lighting system.

The invention claimed is:

1. A lighting system for controlling the growth of plants, the system comprising:
   an array of solid state light sources adapted to emit visible light of a predetermined wavelength or wavelength range from 400 nm to 800 nm;
   a cooling arrangement comprising a pipe for conducting a cooling medium, the pipe having at least one inlet opening for receiving a gaseous cooling medium and a plurality of outlet openings for releasing said gaseous cooling medium from said cooling arrangement, the cooling arrangement being in mechanical and thermal contact with said light sources, wherein said array of solid state light sources is arranged only on the outside of said pipe, wherein the cooling arrangement is connectable to a $CO_2$ source and configured to allow $CO_2$ to be released through the plurality of outlet openings, and wherein said solid state light sources and said plurality of outlet openings are configured to modify light intensity, temperature, and $CO_2$ concentration locally around said plants and further configured to promote photosynthesis of said plants.

2. A lighting system according to claim 1, wherein said pipe is thermally conductive.

3. A lighting system according to claim 1, wherein said outlet openings are closable.

4. A lighting system according to claim 3, wherein the openings are variably closable so that the size of the outlet openings is adjustable.

5. A lighting system according to claim 1, wherein the cooling arrangement forms an open system.

6. A lighting system according to claim 1, wherein at least part of said pipe is in thermal connection with said light sources.

7. A lighting system according to claim 1, wherein said outlet openings are located on the same side of the pipe as the light sources.

8. A lighting system according to claim 1, further comprising one or more of the following devices and monitors: a closure control device for controlling the size of the outlet openings; a light output control device; a temperature monitor; a $CO_2$ content monitor; and a clock or a timer.

9. A method of controlling the growth of a plant in a greenhouse or growth chamber, comprising steps of:
providing a lighting system, comprising an array of solid state light sources adapted to emit visible light of a predetermined wavelength or wavelength range from 400 nm to 800 nm and a cooling arrangement comprising pipe for conducting a cooling medium, the pipe having at least one inlet opening for receiving a gaseous cooling medium and a plurality of outlet openings for releasing said gaseous cooling medium from said cooling arrangement, the cooling arrangement being a mechanical and thermal contact with said light source, wherein said array of solid state light sources is arranged only on the outside of said pipe, wherein said array of light sources and said plurality of outlet openings are located in the interior of the greenhouse or growth chamber, and wherein said solid state light sources and said plurality of outlet openings are configured to modify light intensity, temperature, and $CO_2$ concentration locally around said plant and further configured to promote photosynthesis of said plant;
introducing a cooling medium containing $CO_2$ into the pipe via the at least one inlet opening;
conducting said cooling medium containing $CO_2$ through the pipe such that the cooling medium may absorb heat generated by said array of light sources; and
allowing said cooling medium containing $CO_2$ to escape from the cooling arrangement via one or more of the outlet openings into the greenhouse or growth chamber.

10. A method according to claim 9, wherein at least one of said light sources and at least one of said plurality of outlet openings both are located in the vicinity of a plant whose growth is to be controlled.

11. A method according to claim 9, wherein said cooling medium is ambient air collected from outside the greenhouse or growth chamber.

12. A method according to claim 11, comprising the step of supplementing the cooling medium with $CO_2$ before it is allowed to escape from the cooling arrangement into the greenhouse or growth chamber.

13. A method according to claim 9, wherein the cooling medium has a $CO_2$ content of at least 500 ppm.

* * * * *